Patented July 3, 1928.

1,676,160

UNITED STATES PATENT OFFICE.

MEYER F. RUFFNER, OF WASHINGTON, DISTRICT OF COLUMBIA, ASSIGNOR TO POTATO WAFFLES, INC., OF NEW YORK, N. Y., A CORPORATION OF DELAWARE.

FOOD PRODUCT AND PROCESS OF MAKING THE SAME.

No Drawing.     Application filed June 8, 1925.   Serial No. 35,763.

This invention relates to processes of preparing food, and more particularly to a process of cooking potatoes to produce a product somewhat similar to potato chips, and this application is, in part, a continuation of my copending application for processes of preparing food, filed November 23, 1922, Serial No. 602,865, but embodies improvements on the process set forth therein.

Potato chips as manufactured and sold constitute a pleasing and popular food commodity but in distribution to consumers are subject to rapid deterioration. They quickly lose their crispness particularly in damp weather and speedily acquire an "off" taste and frequently a noticeably rancid odor, particularly in hot weather. These are very important disadvantages which, prior to my invention, have not been overcome.

An important object of this invention is to provide an improved method of cooking potatoes whereby a healthful, readily digested product of the nature of potato chips is obtained having a distinctive, pleasing taste and which is not greatly affected by atmospheric moisture even in damp weather and which will retain its crispness and unimpaired flavor for a much longer period than ordinary potato chips.

In practicing my process, the potatoes are first prepared by peeling them and slicing them to a desired size. While the potatoes may be sliced in any desired manner, I preferably employ slices of about five times the thickness of an ordinary potato chip and perforated. These slices may be obtained by using the vegetable slicing machine described and claimed in my Patent No. 1,534,078, granted April 21, 1925. The sliced potatoes are then cured in water at ordinary atmospheric temperature or preferably slightly below atmospheric temperature for a considerable period of time and are then removed from the water, drained and dried. The potatoes prepared in the manner above described are then cooked in a grease consisting of a mixture of edible vegetable oils, one of which is corn oil, and a fat preferably an animal fat, having a high stearine content. After cooking, the potatoes are dried preferably at an elevated temperature, producing a product somewhat similar to potato chips but possessing the advantages that it will not readily take up atmospheric moisture, become rancid or acquire an "off" flavor and will retain its crispness and pleasing, distinctive flavor for a long period of time thereby overcoming the disadvantages in these respects of ordinary potato chips. Tests of my product have demonstrated that it will retain its crispness and unimpaired flavor for more than six weeks regardless of weather conditions.

In a preferred practice of my process, the potatoes are first peeled and sliced. As stated, they may be sliced in any suitable manner, but I preferably employ slices having a thickness of about one-eighth of an inch and in practice, I employ the machine disclosed in my patent hereinbefore referred to for the purpose of slicing the potatoes, giving a sliced perforated product of lattice like form. The slices are submerged in water at a temperature between 50° and 75° F., and preferably at a temperature of 62° F., for a period of from one to three hours, and preferably for a period of about two hours and thirty-five minutes. After the potatoes have become thoroughly soaked in water by the curing process, they are removed from the water and drained. While it is impossible to state definitely what physical or chemical change takes place during the curing operation, the treatment does not extract any considerable portion of the starch or food value from the potato when slices of this thickness are employed. That the starch granules are altered by this curing operation is apparent as the slices become brittle and take on a peculiar appearance resembling a crystalline structure or formation. The treatment properly conditions the potato for cooking in the mixture of cooking oils and fat employed. When the slices thus treated are cooked as described the thinner portions of the slices adjacent the perforations are not overcooked or burned in the time required to cook the thicker portions and the cooked slices are of substantially uniform taste throughout.

The cured potatoes are then dried, preferably at normal room temperature for a period of substantially thirty minutes and are then ready for cooking. They are fried in deep grease with the grease preferably at an initial temperature of about 400° F. When the batch of cold sliced potatoes is placed in the grease, the temperature drops to a temperature between 225° and 275° F., and as the grease is heated, gradually rises until a temperature between 325° and 400° F., is reached. In frying the potatoes, I use a mixture of edible vegetable oils, one of which is corn oil and a fat preferably an animal fat, which has a high stearine content, and I prefer to employ a mixture of 50 gallons of corn oil, 50 gallons of cottonseed oil, and 5 pounds of tallow. It is particularly advantageous to employ high grade corn oil and high grade cottonseed or other vegetable oil, containing little or no stearine. Van Camp's excelsior corn oil and Van Camp's nonpareil cottonseed oil are of the type of such oils which are particularly well suited for use in making my cooking oil mixture.

The cooking operation ordinarily is continued for a period of from eight to eleven minutes and the product is then dried at an elevated temperature, preferably at a temperature of about 105° F.

In order to produce my improved product it is essential to cure the sliced potatoes by prolonged soaking in water and to cook the thus pretreated slices in a mixture of vegetable oils, one of which is corn oil, and a fat of high stearine content. Some measure of success may be obtained by substituting other high grade vegetable cooking oils (other than corn oil), for the cottonseed oil but I prefer to use cottonseed oil with the corn oil in the cooking oil mixture. Similarly some measure of success is obtainable by varying the proportions of the vegetable oils and the proportion of the fat of high stearine content with reference thereto but at least about one-fourth and not to exceed about three-fourths of the cooking oil mixture must be corn oil, the balance being cottonseed or other cooking oil (other than corn oil) and a fat of high stearine content. The proportion of the fat of high stearine content to the other ingredients of the cooking oil mixture may be varied but in the case of tallow or other fat consisting substantially wholly of stearine, should not be less than about .5 per cent nor more than about 12 per cent by volume of such mixture and I have obtained the best results by the use of about 1 per cent by volume of tallow.

Corn oil heretofore has not been satisfactorily usable in the manufacture of such a potato product as I produce and cannot be satisfactorily used alone or with a fat of high stearine content in the practice of my process but by admixture with cottonseed or other high grade vegetable cooking oil (other than corn oil) and a fat of high stearine content in the proportions hereinbefore indicated and preferably in the proportions of 50 gallons of corn oil, 50 gallons of cottonseed oil and 5 pounds of tallow, the oil mixture is not only satisfactorily usable in the production of my product, but such product prepared therein has the peculiar advantageous characteristics herein described.

While I have described in detail the preferred practice of my process, it is to be understood that the details of procedure may be widely varied without departing from the spirit of the invention or the scope of the subjoined claims.

I claim:

1. The process of preparing a food product of the character described which comprises immersing thin slices of potato in cold water for a prolonged period and cooking the thus treated slices in a mixture of edible vegetable oils, such mixture including corn oil and containing a relatively small proportion of a fat of high stearine content.

2. The process of preparing a food product of the character described which comprises immersing thin slices of potato in cold water for from 1 to 3 hours and cooking the thus treated slices in a mixture of edible vegetable oils free from a material amount of stearine, one of which oils is corn oil, such mixture containing a relatively small proportion of a fat of high stearine content, the corn oil being present in the proportion of from about one-fourth to about three-fourths by volume of the oil mixture.

3. The process of preparing a food product of the character described which comprises immersing thin slices of potato in cold water for from 1 to 3 hours and cooking the thus treated slices in a mixture of edible vegetable oils free from a material amount of stearine, one of which oils is corn oil, such mixture containing a relatively small proportion of an animal fat of high stearine content, the corn oil being present in the proportion of about 50 per cent by volume of the oil mixture.

4. The process of preparing a food product of the character described comprising immersing thin slices of potato of a thickness of about one-eighth inch in cold water for about two and one-half hours and cooking the thus treated potato slices in a mixture of approximately equal parts by volume of corn and cottonseed oils free from a material amount of stearine, such mixture containing a relatively small proportion of an animal fat of high stearine content.

5. The process of preparing a food product of the character described comprising immersing perforated slices of potato of lattice like form and of a thickness of about one-eighth inch in water at a temperature of about 62° F., for about two and a half hours, drying the thus treated slices at normal atmospheric temperature for about 30 minutes, cooking the thus treated slices for from about 8 to 11 minutes at a temperature not materially in excess of about 400° F. in a mixture of about equal parts of corn oil and cottonseed oil free from a material amount of stearine, the mixture containing about one per cent by volume of tallow, and drying the product at an elevated temperature.

6. The herein described food product of the nature of potato chips consisting of thin slices of potato wherein the starch granules have been modified in character by prolonged soaking in cold water and cooking in a mixture of edible oils, a substantial proportion of such oil mixture being corn oil and such mixture containing a relatively small proportion of a fat of high stearine content, such product being of a distinctive taste, not readily affected by atmospheric moisture and which retains its crispness and flavor unimpaired for a long period of time.

7. The herein described food product of the nature of potato chips consisting of perforated slices of potato of approximately one-eighth of an inch in thickness and of lattice like form, wherein the starch granules have been modified by prolonged soaking in water and cooking in a mixture of about equal parts of corn oil and cottonseed oil and containing a relatively small proportion of an animal fat of high stearine content, such product being of a distinctive and uniform taste throughout, not readily affected by atmospheric moisture and which retains its crispness and flavor unimpaired for a long period of time.

In testimony whereof, I affix my signature.

MEYER F. RUFFNER.